United States Patent [19]
Teitelbaum

[11] 3,753,546
[45] Aug. 21, 1973

[54] SLEEVE VALVE

[75] Inventor: Bernard R. Teitelbaum, Birmingham, Mich.

[73] Assignee: The Bendix Corporation, Southfield, Mich.

[22] Filed: Sept. 2, 1971

[21] Appl. No.: 177,240

[52] U.S. Cl. .................................. 251/9, 251/342
[51] Int. Cl. ............................................ F16k 7/06
[58] Field of Search ............... 251/4–10, 342, 331; 222/213

[56] References Cited
UNITED STATES PATENTS

| | | | |
|---|---|---|---|
| 2,314,767 | 3/1943 | Burrell | 251/8 |
| 2,622,620 | 12/1952 | Annin | 251/5 |
| 2,706,101 | 4/1955 | Cantor | 251/342 X |
| 2,946,555 | 7/1960 | Cantor | 251/342 |

Primary Examiner—Martin P. Schwadron
Assistant Examiner—Richard Gerard
Attorney—William S. Thompson and John R. Benefiel

[57] ABSTRACT

A valve is disclosed which is operated by means of an externally and radially deflectable sleeve which controls fluid flow by not permitting fluid flow in its undeflected state through a valve body disposed in an internal passage of the sleeve, and permitting fluid flow therethrough in its deflected state by blocking and unblocking valve ports in circumferentially spaced protuberance formed in the valve body member to thus provide the valving function without an operator extending from the ambient region into the valving chamber.

15 Claims, 4 Drawing Figures

Patented Aug. 21, 1973

3,753,546

INVENTOR
BERNARD R. TEITLEBAUM

BY John R Benefiel
ATTORNEY

SLEEVE VALVE

BACKGROUND OF THE INVENTION

1. Field of the Invention

This invention concerns valves and more particularly valves which perform their function in isolation from ambient fluids.

2. Description of the Prior Art

A most common situation involving the valving function is that where the valve controls fluid communication between two regions, both of which regions are isolated from the ambient, for example, a simple gate valve in a pipe. Typically, a mechanically or electrically controlled valve operator extends from the ambient region into the valve chamber to perform its function, and the isolation is maintained by the use of dynamic seals between the operator and the valve housing. Thsee dynamic seals can be of the packing type or the bellows type. An alternate approach is to dispose the valving mechanism entirely within the valve housing and operate it by means of magnetic or other non-mechanical means.

These approaches are completely satisfactory for a great many applications but for certain applications such as an electrically controlled valve for use in anti-skid or adaptive automotive or aircraft braking systems certain design requirements become of greater importance, which requirements are not fully met by these prior art approaches:

a. Minimum maintenance requirements. The use of dynamic seals of the packing type, as in the classic gate valve, inevitably causes eventual seal wear, and consequently leakage and servicing problems, while the magnetic valve tends to be of less than optimum reliability because of the sliding movement usually involved and the non-mechanical operation, and the resulting need for service and inspection is very inconvenient as the valve must be completely disassembled and the fluid system opened to gain access to the moving parts.

b. Extreme reliability and mechanical operator redundancy of the operator mechanism for safety's sake. The electrically actuated stem operated solenoid valve tends to be less than wholly reliable, and mechanical operator redundancy is difficult to incorporate for most designs. The magnetic type valves are deficient from a reliability standpoint as noted, and are impossible to operate mechanically.

c. Rapid response times. Typical adaptive braking systems require extremely rapid valve response to control signals, and both the prior art valves described involve relatively large masses and extent of movement of the valve operator or valve member.

d. Low manufacturing costs. Prior art valves fulfilling even partially these rigorous design requirements tend to be expensive, which has contributed to excessive total costs of such systems particularly those intended for automotive applications. Prior art valves using bellows type dynamic seals are examples of valves having high manufacturing costs, as well as being relatively bulky.

Another valving approach as disclosed in U.S. Pat. No. 2,706,101 provides certain of these features, but as it depends on the use of relatively elastic material, its use is limited to extremely low pressure environments and cannot provide the requirements in the typical adaptive braking designs.

Therefore, it is an object of the present invention to provide a valve suitable for such applications which requires a minimum of maintenance effort, is highly reliable and easily operated mechanically to provide redundancy, is capable of rapid response, while being of a low manufacturing cost configuration.

SUMMARY OF THE INVENTION

This and other objects are accomplished by providing a valve which is operated by means of an externally and radially deflectable sleeve which controls fluid flow by not permitting fluid flow in its undeflected state through a valve body disposed in an internal passage of the sleeve, and permitting fluid flow therethrough in its deflected state by blocking and unblocking valve ports in circumferentially spaced protuberances formed in the valve body member to thus provide the valving function without an operator extending from the ambient region into the valving chamber.

DETAILED DESCRIPTION

Figure 1:
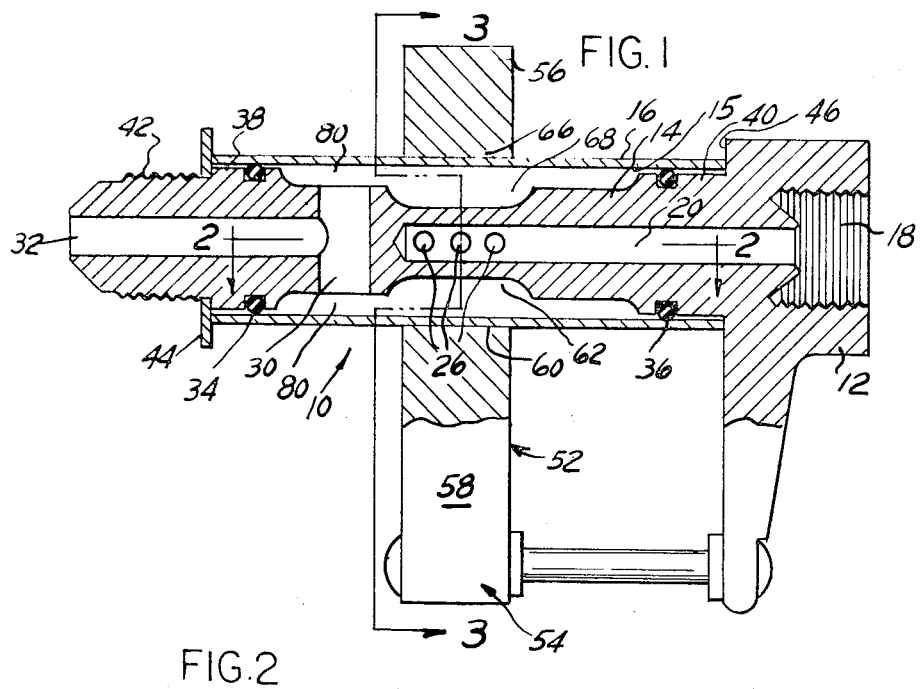
FIG. 1 is a view in partial longitudinal section of valve according to the present invention.
Figure 2:
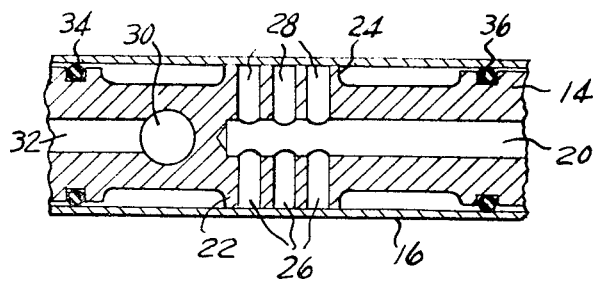
FIG. 2 is a view of the section 2—2 taken in FIG. 1.
Figure 3:
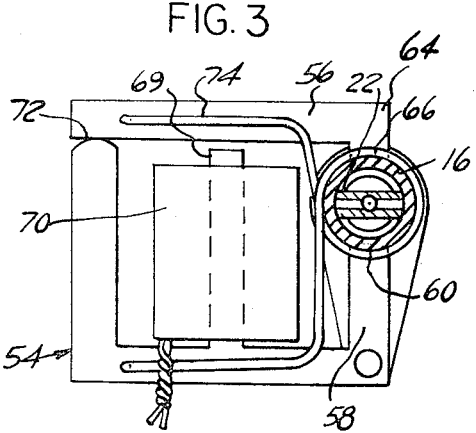
FIG. 3 is a view of the section 3—3 taken in FIG. 1.

Referring to the drawings, the valve 10 is depicted in FIG. 1, and includes a valve body 12 having a valving section 14 disposed within an internal passage 15 in a sleeve element 16.

The valve body 12 is formed with an inlet port 18 communicating with a central fluid passage 20 formed in the valving section 14 and which terminates approximately midway down its length. At this point, the valving section 14 is formed with a pair of circumferentially spaced protuberances 22 and 24 with a series of fluid metering holes 26 and 28 cross drilled into the central passage 20 and exiting on the outer surfaces of the protuberances 22 and 24.

Immediately past the protuberances 22 and 24, a cross fluid passage 30 is formed, intersecting an outlet fluid passage 32.

The sleeve 16 is formed of a suitable material and thickness so as to provide the necessary stiffness and fatigue strength to be radially deflected in the manner to be described, and is sealed by static packings or O-rings at 34 and 36, disposed between the O.D. of enlarged sections 38 and 40 of the valving section 14 and the I.D. of the ends of sleeve 16. The sleeve 16 is retained on the valving portion 14 by the thrust of the fluid fitting (not shown) threaded onto end portion 42 and bearing against a thrust washer 44 positioned against the sleeve 16 which is seated at its other end against the abutment 46 formed on the valve body 12.

Alternatively many other arrangements for sealing or securing the sleeve 16 to the valve body 12 could be employed, as, for example, a brazed or welded connection therebetween.

The sleeve 16 is loosely fit over the end portions 38 and 40, but is press fitted over the outer surfaces of the protuberances 22 and 24 which are arced to conform with the inner curvature of sleeve 16 to define valving surfaces 48, 50.

A solenoid actuator mechanism 52 is disposed axially aligned with the protuberances 22 and 24 and which includes a frame 54 and an armature 56. The frame 54 includes a portion 58 which engages the outer surface of the sleeve 16 at 60 which is midway between the protuberances 22 and 24 aligned with relieved area 62 on the valving portion 14.

The armature 56 likewise includes a portion 64 engaging the sleeve 16 O.D. at 66 opposite the point 60 and aligned with relieved area 68 on the valving portion 14.

These external elements would preferably be fabricated from stamped, laminated ferromagnetic parts to provide a low cost construction while minimizing response times to the magnetic flux generated by a coil 70.

Frame 54 also includes a core portion 69 with the coil 70 disposed in surrounding relationship therewith.

The frame 54 and armature 56 are held in engagement with the sleeve 16 and with each other at the rolling joint 72 by means of a bias spring 74 looped around the sleeve 16 and fastened to each element. The force exerted by the spring 74 is such that no appreciable deflection of the sleeve 16 occurs thereby.

Figure 4:
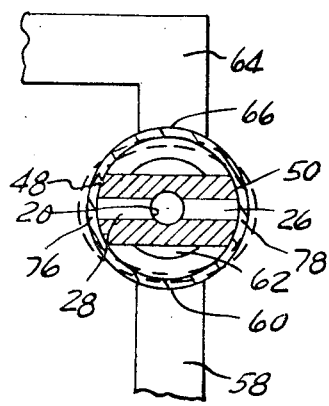
FIG. 4 is an enlarged view of the valve sleeve and operator showing its actuated and inactivated positions.

In operation, if the coil 70 is not energized, the sleeve 16 grips the valving surfaces 48 and 50 of the protuberances 22 and 24 so as to prevent flow from the inlet 18 to the outlet 32. If the coil 70 is energized, the armature 56 is drawn towards the core 69 by magnetic attraction thereto and portions 58 and 64 squeeze the sleeve 16 at points 60 and 66 to cause radially inward deflection at those points. As a result of the deflections, the cross section shape of the sleeve 16 is elastically deformed into an approximately elliptical shape as depicted in phantom in FIG. 4, which opens up clearance spaces 76 and 78 above the passages 26 and 28 allowing flow into the space 80 between the sleeve 16 and valving portion 14, and thence to passage 30 and outlet 32. The relieved portions 62 and 68 allow greater inward deflection of the sleeve 16 to insure that the clearances 76 and 78 are of adequate area.

It can be appreciated that the basic valving action is dependent on sufficient gripping forces between the sleeve 16 and the valving portion 14 to prevent hydrostatic pressure in passages 26 and 28 from deflecting the sleeve 16 so as to allow flow, hence the various elements must be designed to provide sufficient gripping forces for the expected pressure differentials to be experienced across the sleeve 16.

The coil 70 may be energized in an "on-off" mode in which the sleeve 16 is deflected to its maximum "stroke" in each cycle, with control over the relative extent of flow provided if desired by a rapid cycling in which the relative share of an on to off time can be varied.

Alternatively, the extent of sleeve 16 deflection may be controlled by controlling the level of power to the coil 70 to provide a "proportional" mode of operation, as by a varying D.C. current, or varying average value of A.C. current with a frequency well above the natural frequency of the mechanism.

Many variations of this principle are of course possible as for example reversing the inlet and outlet connections. This arrangement however, would not be advantageous in many situations as the supply pressure would be tending to distend the sleeve 16.

From the above description it can be appreciated that many advantages accrue from this design:

a. The device is reliable in that no sliding parts or complex operator or valving mechanisms are involved, also eliminating dynamic seals.

b. Ease of maintenance is achieved since all moving parts are exposed for service access and inspection and these parts may be serviced without breaching the fluid system.

c. A mechanical backup mechanism is easily added since a linkage mechanism could be readily incorporated to impose a pushing force on the armature in the event of an electrical failure.

d. Rapid responses are possible since sliding parts and relatively high mass valving parts each as poppets and spools are eliminated.

e. Low manufacturing costs are possible due to the simplicity of the device and the geometry of the components are all such that conventional and low cost fabrication techniques may be utilized.

These advantages are obtained without sacrificing efficiency or excessive increases in valve size.

While I have described a preferred embodiment of the present invention, it should be understood that various changes, adaptions and modifications may be made therein without departing from the spirit of the invention and the scope of the appending claims.

Therefore, what is claimed is:

1. A valve comprising:
    a radially deflectable sleeve member having an internal passage formed therein;
    a valve body member having a valving section disposed within said passage and having circumferentially spaced protuberances formed thereon normally gripped by said sleeve member and in engagement with said passage walls;
    valving means providing a fluid flow path establishing flow through said valve in response to radial deflection of portions of said sleeve into spaces on said valve member intermediate said protuberances, said deflection causing development of a clearance between said sleeve member and said valve body member including said protuberances to define said flow path, said valving means also arresting flow through said valve by elimination of said flow path defined by said clearance space whenever said sleeve member grips said protuberances.

2. The valve of claim 1 wherein said valving means includes:
    a fluid passage means formed in said valve body member including at least one fluid passage formed in said valving section and extending into at least one of said protuberances.

3. The valve of claim 2 wherein said at least one fluid passage extending into said at least one of said protuberances exits on the surface of said at least one of said protuberances gripped by said sleeve member to define a valving surface thereon.

4. The valve of claim 2 wherein said valving means also includes another fluid passage means formed in said body defining in part said fluid flow path including a fluid passage extending through said valving section spaced from said protuberances and opening into a clearance space between said sleeve member and said valving section.

5. The valve of claim 4 wherein said valving section is sealed to said internal passage walls at positions on either side of said protuberances.

6. The valve of claim 1 further including actuation means selectively actuatable to radially deflect said sleeve member so as to create said flow path.

7. The valve of claim 6 wherein said actuation means includes a pair of elements engaging said sleeve member periphery axially aligned with said protuberances but circumferentially spaced therefrom and further includes means for causing said elements to move towards each other to cause said radial deflection.

8. The valve of claim 7 wherein said actuation means further includes means for exerting a magnetic force on said elements to cause said movement thereof.

9. A valve comprising:
a radially deflectable sleeve member having an internal passage formed therein;
a valve body member having a valving section disposed within said passage and having at least one protuberance formed thereon normally gripped by said sleeve member in engagement with said passage walls;
valving means providing a fluid flow path establishing flow through said valve in response to radial deflection of portions of said sleeve into spaces on said valve member adjacent said protuberance, said deflection causing development of a clearance between said sleeve member and said valve body member including said protuberance to define said flow path, said valving means also arresting flow through said valve by elimination of said flow path defined by said clearance space whenever said sleeve member grips said protuberance, and wherein said valving means also includes a fluid passage means formed in said valve body member including at least one fluid passage formed in said valving section and extending into said at least one protuberance said fluid passage being blocked by said sleeve member gripping said protuberance to arrest flow through said valve.

10. The valve of claim 9 wherein said fluid passage extending into at least one protuberance exits on the surface of said protuberance gripped by said sleeve member to define a valving surface thereon.

11. The valve of claim 10 wherein said valving means also includes another fluid passage means found in said body defining in part said fluid flow path including a fluid passage extending through said valving section spaced from said at least one protuberance and opening into a clearance space between said sleeve member and said valving section.

12. The valve of claim 11 wherein said valving section is sealed to said internal passage walls at positions on either side of said at least one protuberance.

13. The valve of claim 9 further including actuation means selectively actuatable to radially deflect said sleeve member so as to create said flow path.

14. The valve of claim 13 wherein said actuation means includes a pair of elements engaging said sleeve member periphery axially aligned with said at least one protuberance but circumferentially spaced therefrom and further includes means for causing said elements to move together to cause said radial deflection.

15. The valve of claim 14 wherein said actuation means further includes means for exerting a magnetic force on said elements to cause said movement.

* * * * *